Figure 5:
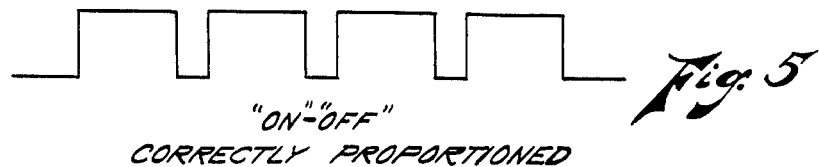

July 26, 1966     D. S. WILLARD     3,263,096
COMMAND PULSE ANALYZER APPARATUS
Filed March 24, 1964                      2 Sheets-Sheet 1
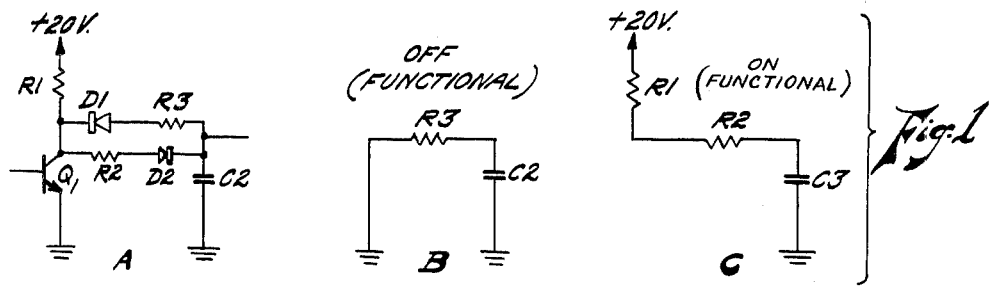
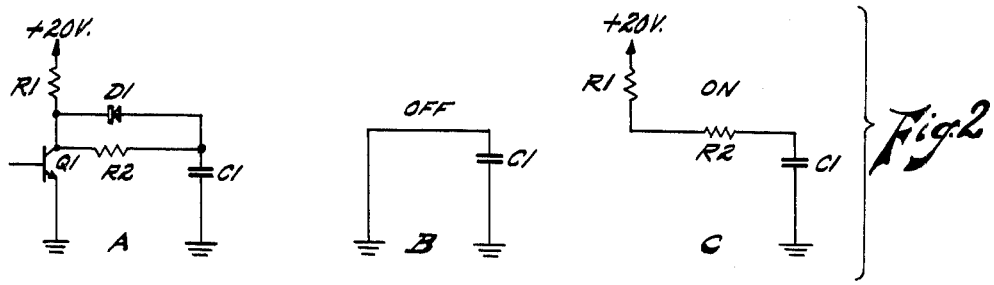
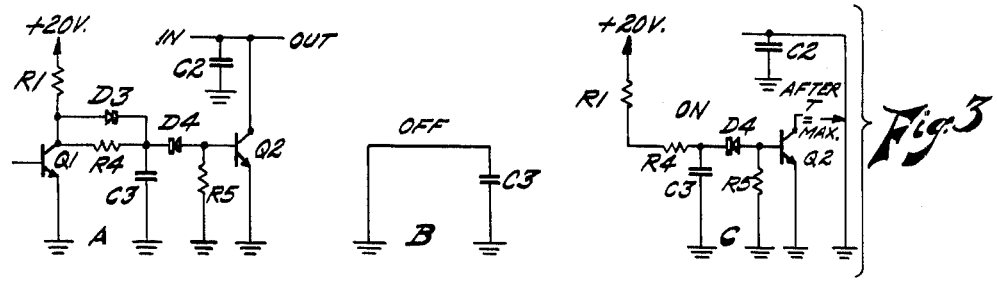
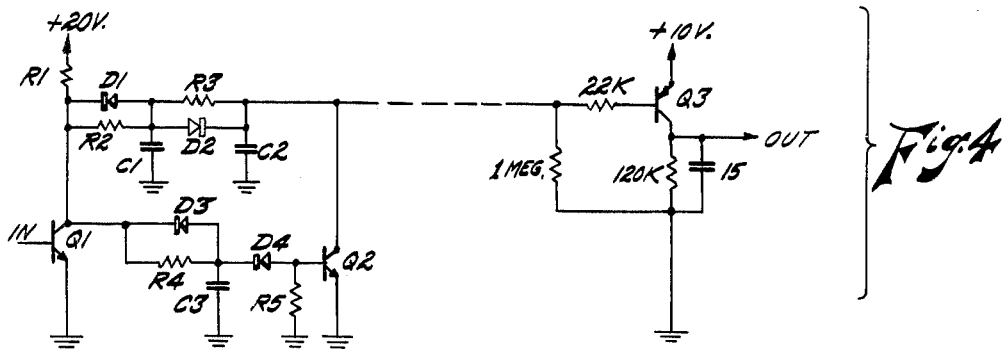
INVENTOR.
DAVID S. WILLARD
BY
ATTORNEYS July 26, 1966  D. S. WILLARD  3,263,096
COMMAND PULSE ANALYZER APPARATUS
Filed March 24, 1964  2 Sheets-Sheet 2

"ON"-"OFF"
CORRECTLY PROPORTIONED

"ON"-"OFF"
RATIO TOO SMALL

"ON"-"OFF"
RATIO TOO LARGE

REP. RATE
TOO FAST

REP. RATE
TOO SLOW

INVENTOR.
DAVID S. WILLARD
BY
ATTORNEYS

United States Patent Office 3,263,096
Patented July 26, 1966

3,263,096
COMMAND PULSE ANALYZER APPARATUS
David S. Willard, Alamogordo, N. Mex., assignor to the United States of America as represented by the Secretary of the Air Force
Filed Mar. 24, 1964, Ser. No. 354,481
1 Claim. (Cl. 307—88.5)

The invention described herein may be manufactured and used by or for the United States Government for governmental purposes without payment to me of any royalty thereon.

In radio controlled command instrumentation, one type of command is based upon a non-symmetrical wave shape. This type of command is exceptionally immune to being falsely commanded by accidental interference.

This principle is accomplished by electro-mechanical means; in my Patent No. 3,045,149 granted to me on July 17, 1962. This new invention accomplishes similar but superior results by a different method, and by purely electronic means.

Objectives to be accomplished are:

(1) To accept only a pulse of specified repetition rate, of a specific On/Off ratio.

(2) To reject repetition rates of either too short or too long duration.

(3) To require a minimum of three repetitive cycles for command acceptance, with the condition that if any one of the cycle wave characteristics are not according to the desired wave form, then it will not contribute essentially to the reception of a command.

(4) To provide that relatively short durations of static interference will not prevent command reception in a command decoder.

In the drawings:

FIGS. 1, 2 and 3 show circuitry operable to accomplish the objectives listed above as first, second, and third objectives, respectively; and FIG. 4 shows circuitry operable to accomplish all four of the above-listed objectives; and FIGS. 5 to 9 are explanatory graphs.

Referring first to FIG. 1, transistor $Q_1$ is connected in such manner as to receive the incoming signal at its base electrode. Its emitter electrode is grounded, as shown, and its collector electrode is tapped into a circuit connected from a positive voltage source to a signal analyzing circuit by either of two parallel paths, one including $C_2$ and discharge diode $D_1$ while the other includes $C_2$ and charging diode $D_2$. (It is to be noted that diodes $D_1$ and $D_2$ have reverse and forward characteristics such as described in the Handbook of Semiconductor Electronics, by Lloyd P. Hunter, second ed., McGraw-Hill Publishing Co., 1962, particularly pages 3–5, 8, 10 and 15, and the accompanying figures.) Grounded capacitor $C_2$ coacts with the described elements, and with resistors $R_1$—$R_2$—$R_3$ to provide a charge-discharge cycle that will allow an output circuit to accept only a signal pulse of a pre-selected repetition rate, with an "on-off" ratio that is likewise pre-selected. FIGS. 1B and 1C show the "off" and "on" components that are the operative factors in the respective actions. This circuit provides acceptance of a specific pulse On/Off ratio.

In FIG. 2, transistor $Q_1$ is again connected as in FIG. 1, but there is now interposed a second grounded capacitor $C_1$ operative to prevent the charging of capacitor $C_2$ (FIG. 1) when the received signal has a repetition rate that is too short to permit adequate charging of capacitor $C_1$. In this way the second of the above-listed objectives is accomplished, namely, the rejection of signals when the repetition rate is too short. The "off" and "on" components are shown in FIGS. 2B and 2C, respectively.

In FIG. 3, a second transistor $Q_2$ is interposed between the capacitor $C_2$ and the signal response unit, and prevents effective charging of the capacitor when the incoming signal has an "on" duration that is too long, that is, of a length to exceed the known length of the command signal. On such occasions the intervening capacitor $C_3$ will charge and cause conduction to occur through diode $D_4$, whereupon transistor $Q_2$ will discharge capacitor $C_2$ and thus prevent effective transmission of a signal to the output line leading to the output circuit of $Q_3$. The "off" and "on" components are shown in FIGS. 3A and 3B, respectively.

FIG. 4 is a composite of FIGS. 1, 2 and 3 plus a third transistor, $Q_3$ (of opposite polarity, and powered from a second source) and associated parts functioning to require several repetitions of the true command signal before the signal output to $Q_3$ becomes sufficiently strong to actuate that unit.

Figure 6:
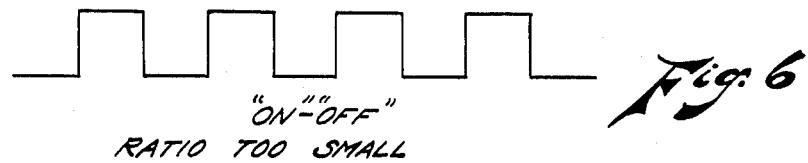
Figure 7:
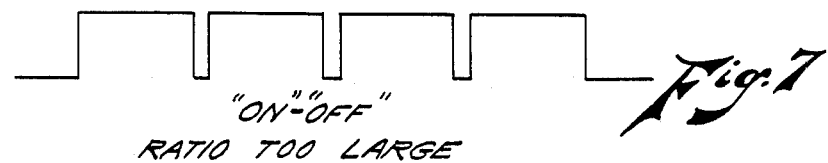
Figure 8:
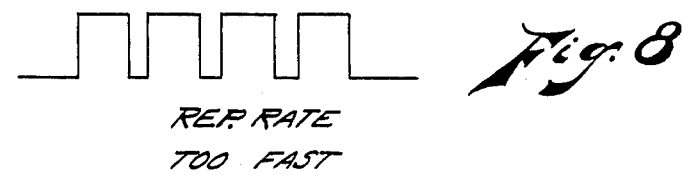
Figure 9:
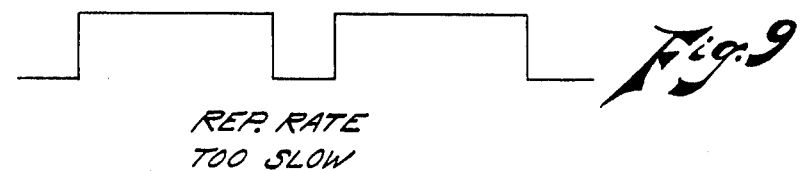

In one application of the circuit of FIG. 4, a pulse repetition rate of one second was employed, and the components were selected (as indicated on the drawing) to accept a pulse that is "on" for more than seventy percent of the time (see FIG. 5) but to reject a pulse that is "on" for more than nine-tenths of a second (see FIG. 7). As it would reject any wave shape that is "on" for less than seventy percent of the time, it will reject the closest possible natural interference signal of fifty percent "on" and fifty percent "off" (FIG. 6). Although the signals in FIGS. 8 and 9 have an acceptable ratio, the first is rejected for having too short a repetition rate, and the second for having its signal "on" for a duration that is too long. More particularly, in FIGURE 4 (which also combines the individual circuit operations of FIGURES 1–3), the circuit operation is as follows: When a pulsed signal is applied to the input of $Q_1$ of a polarity and amplitude such that it will cut off the collector current of $Q_1$, there will then be a positive voltage at the collector of $Q_1$. This positive voltage permits $C_3$ to start charging through $R_4$, $C_1$ to start charging through $R_2$, and $C_2$ to start charging through $R_2$ and $D_2$. After 910 milliseconds of steady signal, the charge on $C_3$ will rise to a value sufficiently high to cause diode $D_4$ to break down, thus applying forward bias to $Q_2$. $Q_2$ conducts and effectively short circuits $C_1$ and $C_2$, thus preventing a steady command from activating pulsed command output, $Q_3$. If the command is pulsed (goes off) before 910 milliseconds is reached, $C_3$ is discharged through $D_3$ and $Q_1$. This prevents the charge on $C_3$ from building high enough to break down $D_4$. $R_4$ is used to select the charging rate of $C_3$ to be compatible with the pulse rate, and to match the characteristics of $D_4$. If the command is pulsed (oftener than 910 milliseconds), $C_1$ and $C_2$ charge each time $Q_1$ is cut off. Each time $Q_1$ conducts, $C_1$ is discharged very rapidly through $D_1$ and $Q_1$. $C_2$ is discharged more slowly through $R_3$, $D_1$, and $Q_1$. If the pulse repetition rate is too fast (approximately 500 milliseconds or less) then $C_1$ cannot reach a high enough level of charge to allow $C_2$ to charge enough to cut off $Q_3$. The charging time constants of $C_2$ provide that at least three consecutive pulses of proper time duration must occur before $Q_3$ can be cut off and thus provide a usable output. If the command pulse has the proper on-off ratio (710 to 900 milliseconds on, out of a repetition rate of 1000 milliseconds) $C_2$ will charge and cut off $Q_3$, providing an output signal indicative of a properly pulsed command.

What I claim is:

Pulse analyzer apparatus comprising a pulse input circuit, an output circuit, a plurality of differentially conducting circuits interconnecting said input circuit with said output circuit, said plurality of circuits comprising charge-discharge circuit means for guiding current flow through said differentiating circuits to said output circuit only when said input pulses exceed a predetermined on/off ratio, means for guiding current flow through said differentially conducting circuits to said output circuit only when the repetition rate of pulses from said input circuit is within a predetermined band of pulse repetition rates, and means requiring a minimum of three repetitive cycles for generation of an output signal of sufficient strength to activate said output circuit.

References Cited by the Examiner

UNITED STATES PATENTS

| | | |
|---|---|---|
| 2,759,052 | 8/1956 | MacDonald et al. ____ 307—88.5 |
| 2,871,379 | 1/1959 | Ingham. |
| 2,886,093 | 7/1959 | Castruccio et al. |
| 2,912,579 | 11/1959 | Bates _____ 328—111 |
| 3,138,759 | 6/1964 | Thompson. |
| 3,149,243 | 9/1964 | Garfield. |
| 3,184,606 | 5/1965 | Overden et al. _____ 307—88.5 |
| 3,187,202 | 6/1965 | Case _____ 307—88.5 |
| 3,187,261 | 6/1965 | Matsushima _____ 329—110 |

ARTHUR GAUSS, *Primary Examiner.*

I. C. EDELL, *Assistant Examiner.*